Nov. 30, 1948.  F. H. McCORMICK  2,455,186
DOMESTIC ELECTRIC HEATER

Filed Nov. 2, 1946  7 Sheets-Sheet 1

INVENTOR.
Francis H. McCormick
BY
Spencer Hardman & Sehr
Attorneys

Nov. 30, 1948.  F. H. McCORMICK  2,455,186
DOMESTIC ELECTRIC HEATER
Filed Nov. 2, 1946  7 Sheets—Sheet 6

Fig. 20

ALL SECTIONS

Fig. 21

SECTIONS 2 & 3

Fig. 22

SECTION 3

Nov. 30, 1948.  F. H. McCORMICK  2,455,186

DOMESTIC ELECTRIC HEATER

Filed Nov. 2, 1946  7 Sheets-Sheet 7

Patented Nov. 30, 1948

2,455,186

UNITED STATES PATENT OFFICE 2,455,186

DOMESTIC ELECTRIC HEATER

Francis H. McCormick, Oakwood, Ohio, assignor to General Motors Corporation, Dayton, Ohio, a corporation of Delaware Application November 2, 1946, Serial No. 707,451

19 Claims. (Cl. 201—67)

This invention relates to domestic appliances and more particularly to electric ranges.

An object of this invention is to provide an electric heater of improved efficiency and simplicity of construction.

Another object of this invention is to provide an electric heater in combination with switch control therefor which cooperate in a novel manner.

Another object of this invention is to provide an improved and simplified method of manufacturing an electric heater.

Further objects and advantages of the present invention will be apparent from the following description, reference being had to the accompanying drawings, wherein a preferred form is clearly shown.

Figures 1, 2:
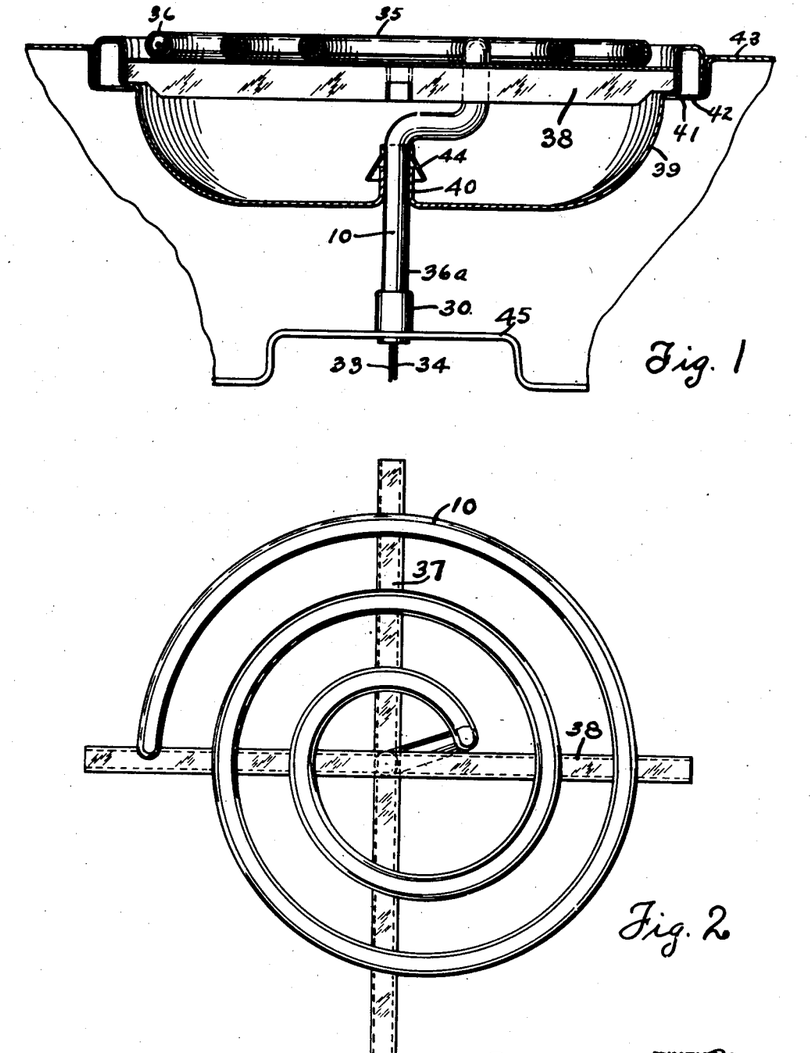
Fig. 1 is a vertical cross-sectional view of one form of heater.
Fig. 2 is a top plan view of Fig. 1.

A heater, according to my invention, includes a tubular sheath 10, which contains a spiral resistance 11, and a conducting rod 12. The spiral resistance 11 is connected at one end to a cylindrical terminal 13, and at the other end to the conducting rod 12 at the point 14. If desired, insulating spacers, of porcelain or the like, are placed between the conducting rod 12 and resistance 11, as indicated at 15, 16 and 17, in order to maintain the rod and resistance in spaced relationship.

Figures 3, 4, 5, 6, 7, 8, 9, 10:
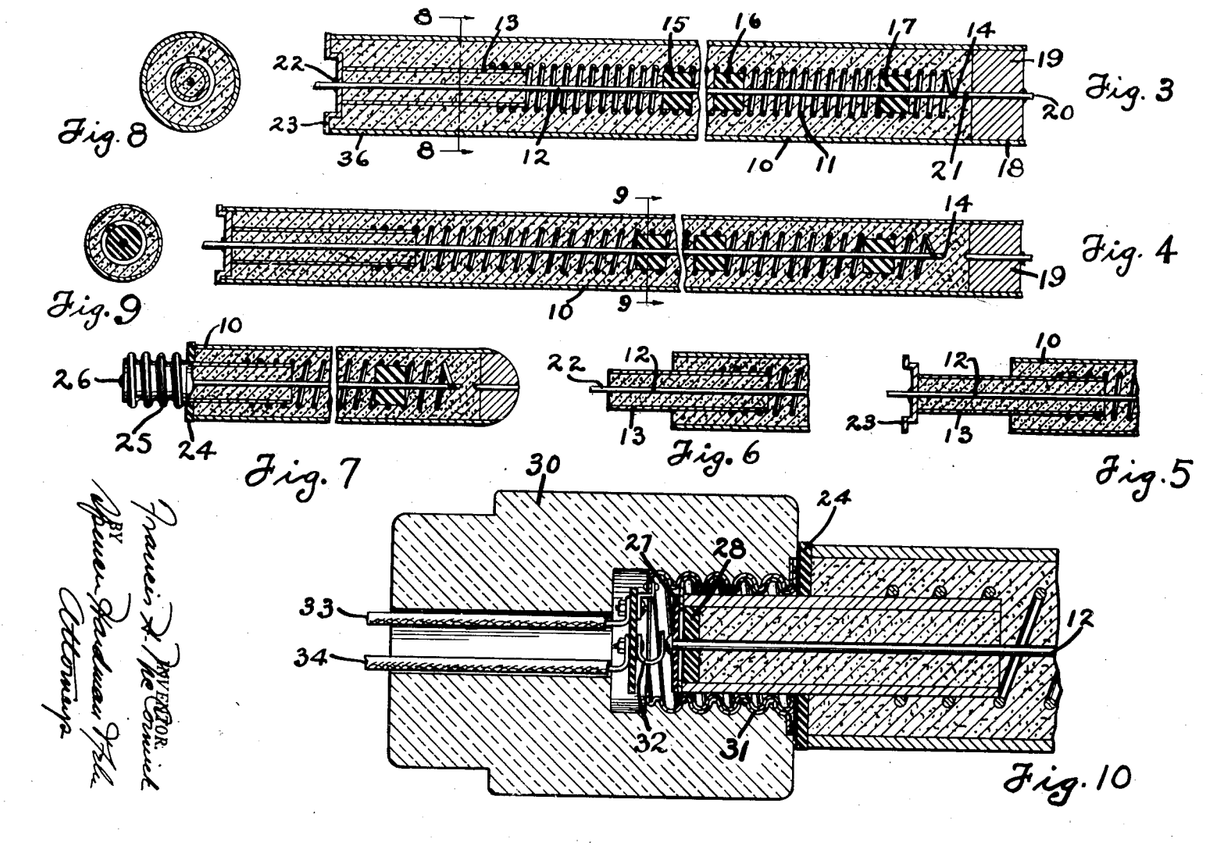
Figs. 3 through 7 are longitudinal cross-sectional views of the heater shown in Fig. 1, in progressive stages of construction.
Fig. 8 is a transverse cross-section taken along the line 8—8 of Fig. 3.
Fig. 9 is a transverse cross-section taken along the line 9—9 of Fig. 4.
Fig. 10 is an enlarged cross-section of the end terminal construction, and socket therefor, of the heater shown in Fig. 1.

In manufacturing the heater, one end 18, of the sheath 10, is sealed by a ductile plug 19, in which one end 20 of the rod 12 is embedded. The rod 12 is partially severed at 21, between the end 18 and the junction point 14. The sheath is then filled with granular insulating material, such as MgO, and then the cylindrical terminal 13 and the end 22 of the rod 12 are secured to a plug 23, which is not welded to the sheath 10, all as shown in Figs. 3 and 8. Thereafter the sheath 10 is contracted radially and elongated longitudinally, as indicated in Figs. 4 and 9, in any well known manner, such as swaging or otherwise compressing. This operation compacts the insulation and also severs the rod 12 at the point 21, so that there is no electrical connection with the plug 19. Thereafter the end of the sheath 10, adjacent the plug 23 is cut away, as indicated in Fig. 5, to expose the cylindrical terminal 13. Thereafter a portion of the cylindrical terminal 13 is, in turn, cut away, as shown in Fig. 6, to expose the end 22 of the rod 12.

The terminals 22 and 13 thus exposed may be connected to a suitable electrical circuit by any one of several means. For example, an insulating disk 24 may be placed around the terminal 13, and against the end of the sheath 10, and a spirally threaded lamp socket member 25 may be secured to the terminal 13, with a central contact button 26 electrically connected to the rod 12, and with the insulating disk 27 interposed therebetween. If desired, the button 26 may be formed by enlarging the end of the rod 12, or it may be welded thereto. A suitable insulating disk 28 may also be placed inside of the terminal 13, to seal out moisture, in the same manner as is done by the disk 24. The lamp socket element 25 may cooperate with the other lamp socket member 30, which contains the threaded conducting sleeve 31 and the central contact member 32 electrically connected respectively with the lines 33 and 34.

The heaters shown in Figs. 3 through 9, after compacting the insulation, may be bent into a curve forming a substantially flat cooking surface 35, and the top and/or bottom may be flattened as at 36 by a press or the like. The end 36a of the sheath 10 depends at the central portion of the heater thus formed, and cooperates with the lamp socket member 30, into which it may be screwed similarly to a lamp. The sheath 10, after being curved as shown in Figs. 1 and 2, rests loosely upon or may be welded, by projection welding or the like, to the transverse channel members 37 and 38, which are adapted to rest on a flanged metallic cup 39, provided with a flanged central opening 40, and having a flange 41 resting on the depressed flange 42 formed in the top surface 43 of the range. If desired, a cone-shaped guard 44 may be attached to the sheath 10, above the opening 40, to prevent spillage through the opening 40. The lamp socket member 30 may be clamped to the support 45 on the range.

Figure 11:
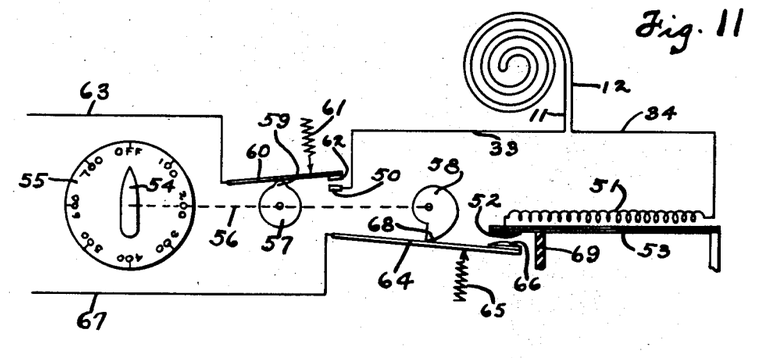
Fig. 11 is a diagrammatic representation of the heater shown in Fig. 1, in combination with an intermittent make and break switch.

The heater heretofore described may be energized by an intermittent make and break switch as shown in Fig. 11. The line 33 may be connected to a stationary contact 50, while the line 34 may pass through a heater 51, of low resistance, which is connected to the contact 52 carried by a thermostatic bimetal blade 53, which bends upward when heated. A rotatable handle 54, in front of a stationary dial 55, operates a shaft, linkage or the like 56, which actuates the cams 57 and 58. The cam 57 is provided with a protuberance 59 to open the blade 60 against the compression spring 61 to open the contact 62 from the contact 50, in the off position of handle 54. The blade 60 is connected to a power line 63. The cam 58 is spirally shaped, as shown, in order to allow the blade 64 to be pushed gradually upward by the compression spring 65, as the handle 54 is turned clockwise from the off position. This clockwise movement of handle 54 allows blade 64 and contact 66 to rise gradually until 66 is brought into contact with 52 the necessary distance to establish a circuit with the power lines 67 and 63. As the resistances 11 and 51 become hot, the thermostatic blade 53 bends upward until the contact 52 is lifted from contact 66. This establishes a break interval of time, during which the resistance 51 and thermostat blade 53 cool to the point where the blade 53 bends downward to make contact between 52 and 66 to begin another heating cycle. Thus an adjustable make and break cycling interval is established. In the off position of the handle 54, the protuberance 59 retains one side of the line open at 50—62, while the other side of the line is also retained open because the portion 68 of the cam 58 maintains the contact 66 open below the lower limit of the downward travel of contact 52, which limit is established by the stop member 69. The shape of cam 58 moves the blade 64 an adjustable distance upward. This makes an adjustable heating cycle, adjusted by the position of handle 54.

Figure 12:
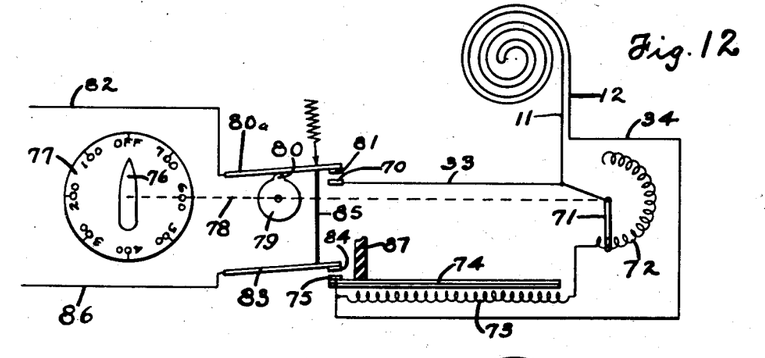
Fig. 12 is a view similar to Fig. 11, but showing a modified form of the switch.

In the modification shown in Fig. 12, the resistance 11, and line 33 are connected to the stationary contact 70 and to the rotatable contact 71. The contact 71 moves over the rheostat 72, which is connected to a low resistance heater 73 adjacent to a thermostatic bimetal blade 74, carrying contact 75, to which the other end of resistance 73 is connected. The line 34 is also connected to the contact 75. The blade 74 moves downwardly when heated. The rotatable handle 76, movable in front of the stationary dial 77, actuates the shaft or linkage 78, which turns the cam 79 and blade 71. The protuberance 80 opens the blade 80a and contact 81, in the off position of the handle 76, to disconnect the line 33 from the power line 82. The blade 83, carrying contact 84, is interlocked at 85 with the blade 80a and contact 81, so that the line 86 is also disconnected at 75 and 84 in the off position of the handle 76. The upward movement of the thermostatic blade 74 is limited by the insulated stop 87 to prevent closing of the line in the off position. In this modification, the handle 76 is moved counterclockwise from the off position, and thus interposes more of the resistance of the rheostat 72 in the circuit of heater 73 as the handle 76 is moved to higher and higher temperature positions.

In the operation of the modification shown in Fig. 12, the handle 76 is moved counterclockwise to some position, such as 400. The protuberance 80 is moved away to allow the closing of the contacts 70, 81 and 75, 84. This establishes parallel circuits through resistance 11 and the combination of part of rheostat 72 with heater 73. As the heater 73 becomes heated, the blade 74 opens the contact 75 at a suitable time interval, established by the amount of resistance interposed at the rheostat 72. The more the handle 76 is turned counterclockwise, the more resistance is interposed at 72, and therefore it takes longer to heat the thermostat 74. Thus an adjustable cycling period is provided in the resistance 11.

Figure 13:
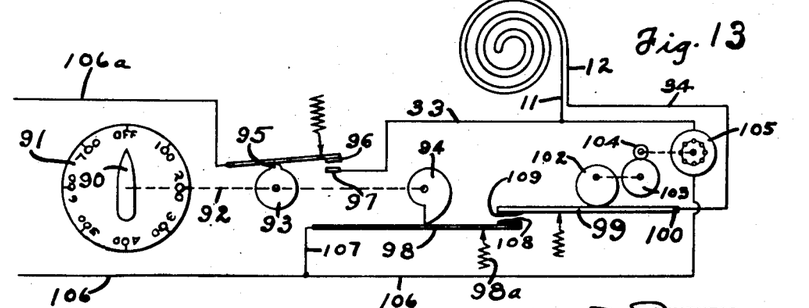
Fig. 13 is a view similar to Fig. 11, but showing a further modified form of the switch.

In the modification shown in Fig. 13, the handle 90 is turned in front of the stationary dial 91 in a clockwise direction from the off position. The handle 90 actuates the shaft or linkage 92, connected to the cams 93 and 94. The cam 93 has the protuberance 95, effective in the off position, to open the contacts 96 and 97, as heretofore described. The cam 94, is effective to move the blade 98 adjustably downwardly, similarly to blade 64 heretofore described against the compression spring 98a. The blade 99 is urged upwardly about a fulcrum 100 by the spring 101 against a slowly rotating cam 102 which is geared by gears 103 and 104 to the synchronous motor 105. The line 33 is connected to the motor 105, and the other terminal thereof is connected to the power line 106. The blade 98 is also connected to the power line 106 at 107.

In the operation of Fig. 13, rotation of handle 90 clockwise from the off position closes the contacts 96, 97 and also the contacts 108 and 109, carried by the blades 98 and 99 respectively. This establishes parallel circuits through the resistance 11 and clock 105 from the power lines 106 and 106a. The slow rotation of the cam 102 establishes intermittent make and break action at contacts 108 and 109. The interval thereof is determined by the position of the handle 90 and the cam 94. As the handle 90 is moved clockwise to higher and higher value the blade 98 moves higher and higher to maintain the contacts 108 and 109 closed for longer intervals of time.

Figures 14, 16:
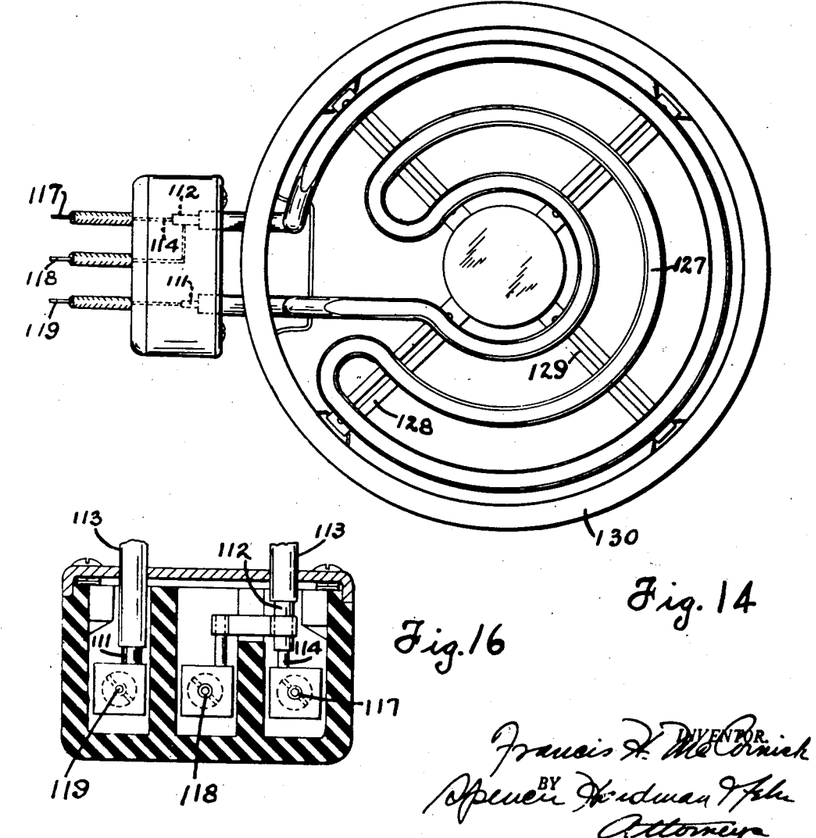
Fig. 14 is a plan view of a heater, somewhat similar to Fig. 1, but modified in certain respects.
Fig. 16 is a cross-section of the connecting means for the terminals of the heater shown in Fig. 14.
Figure 15:
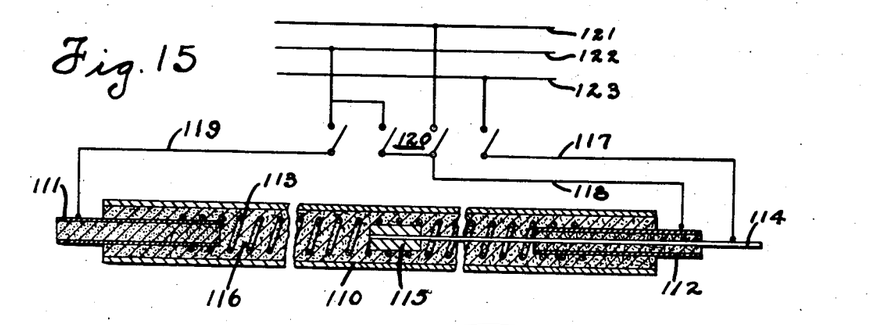
Fig. 15 is a longitudinal cross-section of the heater shown in Fig. 14, and showing its combination with a switch.

In the modification shown in Figs. 14, 15 and 16, the sheath 110 contains a cylindrical terminal 111 at one end and another cylindrical terminal 112 at the other end. The terminals 111 and 112 are connected to the ends of the spiral resistance 113. The conducting rod 114 passes through the cylindrical terminal 112 and is electrically connected at an intermediate portion of resistance 113 by means of the conducting plug 115. The heater may be assembled, filled with granular insulation 116, compacted by radial contraction and longitudinal elongation, in any of the well known manners, as by swaging. Thereafter it may be bent into a curve forming a substantially flat cooking surface, and the top thereof may be flattened as at 127, and the sheath may be welded to the transverse channels 128 and 129, which in turn are supported on a ring 130 substantially as disclosed in the patent to McCormick 2,320,041, granted May 25, 1943. The terminals 111 and 112, and the rod 114 may be connected to the electrical connectors 117, 118 and 119, so that they may be connected to the switch means 120 and from thence to the power lines 121, 122 and 123. The switch means 120 may establish various heating circuits such as disclosed in the patent to McCormick 2,259,258 patented October 14, 1941.

Figure 17:
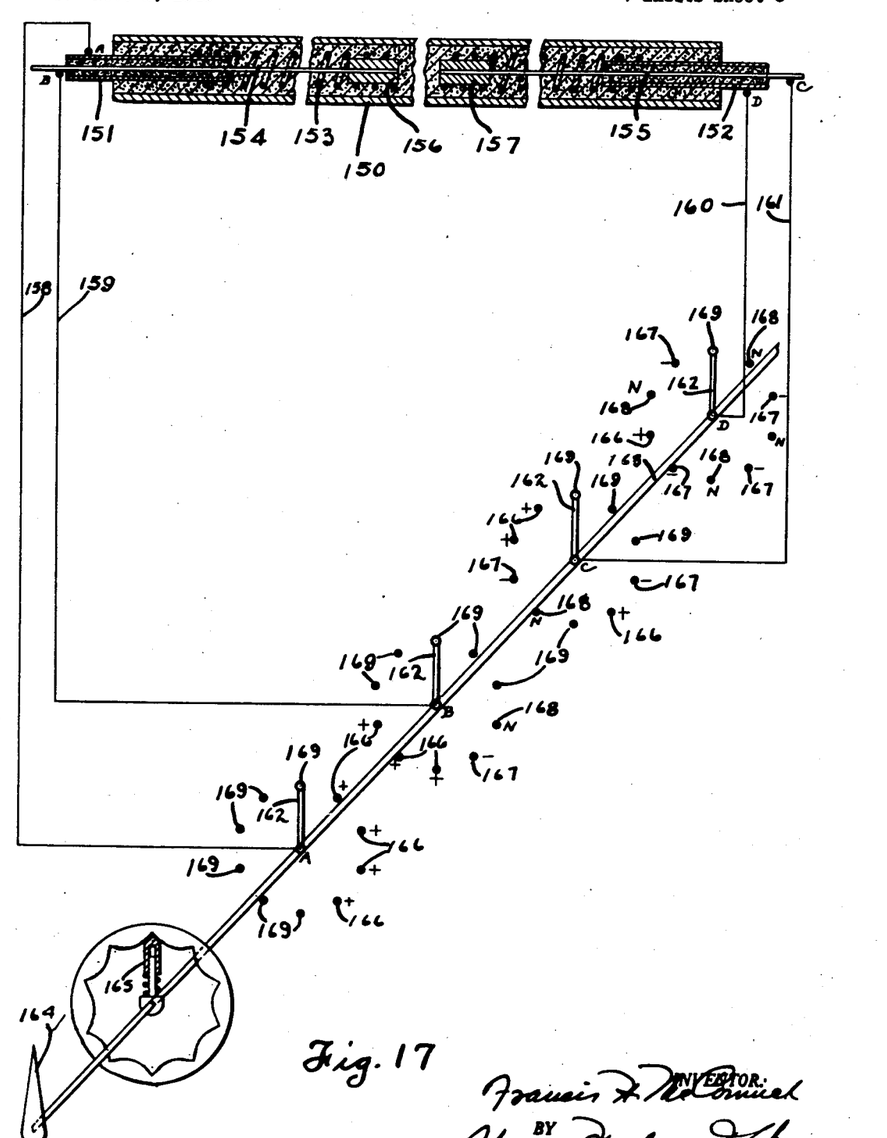
Fig. 17 is a diagrammatic view of a further modified form of heater, shown in combination with a switch therefor.
Figure 18:
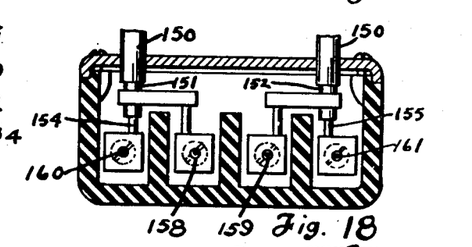
Fig. 18 is a cross-section of the connecting means for the terminals of the heater shown in Fig. 17.

In the modification shown in Figs. 17 through 22, the sheath 150 is provided at its ends with cylindrical terminals 151 and 152. A spiral resistance 153 has its ends connected to the terminals 151 and 152. The conducting rods 154 and 155 pass through the terminals 151 and 152 respectively and are electrically connected to the resistance 153 at intermediate points by means of the conducting plugs 156 and 157 respectively. The sheath 150 may be packed with granular insulating material and may be radially contracted and longitudinally elongated in the well known manner, as by swaging. The terminals 151 and 152 and conducting rods 154 and 155 may be connected to the connecting appliance shown in Fig. 18 to connect them respectively with the electrical lines 158, 159, 160 and 161, as indicated in Fig. 17. These lines are connected to the rotatable contact blades 162 carried by a shaft 163 which is actuated by the handle 164. If desired, the shaft 163 may be provided with the snap-acting mechanism 165, to insure quick movement from the various positions. The contact points 166 are connected to one power line, which has been indicated for convenience as "plus," although it obviously and preferably may be one of the live lines of an alternating current supply. Other contacts 167, indicated by a "minus" sign, are connected to the other live line of the alternating current supply. Other contacts 168 are connected to the neutral line, which has been indicated for convenience with an N. Other contacts, indicated at 169, are not connected to any power line. Any type of well known switch, which may be actuated by a rotatable handle to establish the circuits indicated, may be used. If desired, it may be of the reciprocating blade type, actuated by proper cams in lieu of the rotatable blades. The turning of the handle from the off position to the various other positions establishes the circuits indicated in Figs. 20, 21 and 22.

The heater may be bent into a curve forming a top surface substantially the same as in Fig. 14, with the exception that it has four leads instead of three.

Figures 24, 25, 26, 27, 28, 29, 30, 31, 32:
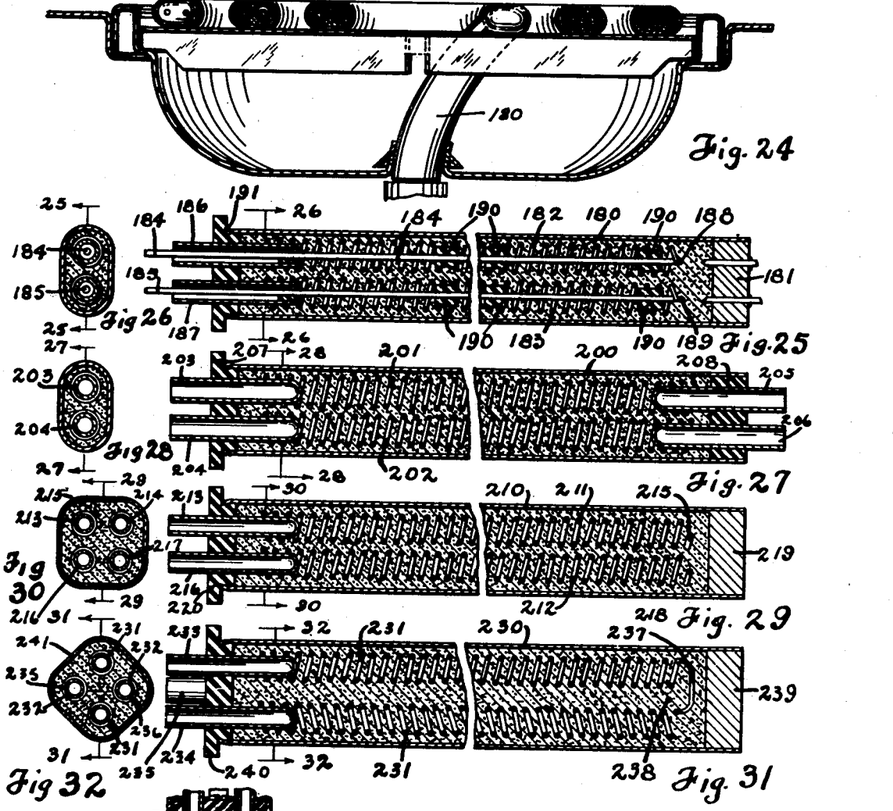
Fig. 24 is a view, similar to Fig. 1, showing a further modified form.
Fig. 25 is a longitudinal cross-sectional view of a heater used in Fig. 24, taken along the line 25—25 of Fig. 26.
Fig. 26 is a cross-sectional view taken along the line 26—26 of Fig. 25.
Fig. 27 is a longitudinal cross-sectional view of a modified form of heater that may be used in a unit somewhat similar to Fig. 14, and taken along the line 27—27 of Fig. 28.
Fig. 28 is a cross-sectional view taken along the line 28—28 of Fig. 27.
Fig. 29 is a longitudinal cross-sectional view of a modified form of heater that may be used in a unit as shown in Fig. 24, and taken along the line 29—29 of Fig. 30.
Fig. 30 is a cross-section taken along the line 30—30 of Fig. 29.
Fig. 31 is a longitudinal cross-section of a further modified form of heater that may be used in a unit as shown in Fig. 24, and taken along the line 31—31 of Fig. 32.
Fig. 32 is a cross-section taken along the line 32—32 of Fig. 31.

In the modification shown in Figs. 24, 25 and 26, a tubular sheath 180 is closed at one end by the ductile plug 181. Two spiral resistances 182 and 183 are placed in parallel relationship within the sheath 180. Conducting rods 184 and 185 are placed within the resistances 182 and 183. The ends of the rods 184 and 185, at one end of the sheath 180, pass through cylindrical conductors 186 and 187. The conductors 186 and 187 are connected to resistances 182 and 183 respectively. The other ends of the rods 184 and 185 originally are connected to the plug 181, similarly to the construction shown in Figs. 3 and 8. After the sheath 180 is elongated, as by swaging, the rods 184 and 185 are severed at 188 and 189, where they are connected to the resistances 182 and 183 respectively. The rods 184 and 185 are spaced from the resistances 182 and 183 by the insulating plugs 190. The cylindrical connectors 186 and 187 are positioned by the insulating plug 191, which is held in place by inwardly striking sheath 180. The modification shown in Figs. 24, 25 and 26 is assembled and manufactured substantially in the same manner as disclosed with respect to Figs. 3 through 9, with the exception that the heater contains two resistances instead of one, and that the terminal is connected to a structure somewhat similar to that shown in Fig. 18, modified as is obvious. This construction provides two resistances which may be connected to a switch structure and circuit substantially as shown in my Patent Number 2,259,258, patented October 14, 1941, or to any other type of switch capable of connecting the heaters independently or in series to the full voltage or half voltage of a three line power source.

Figure 33:
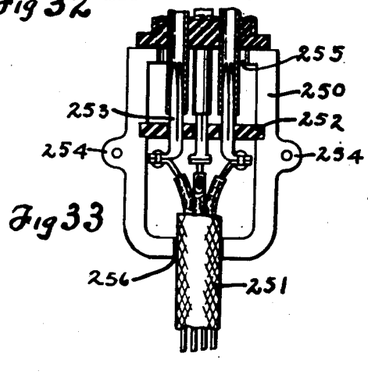
Fig. 33 is a cross-sectional view typical of a terminal construction which may be used with the heaters shown in Figs. 24 through 32.

In the modification shown in Figs. 27 and 28, a tubular sheath 200 is provided with two parallel spiral resistances 201 and 202, which are secured to the cylindrical conductors 203, 204, 205 and 206. The conductors 203 through 206 pass through insulating plugs 207 and 208, similar to plug 191 heretofore described. This heater may be assembled and swaged in the general manner heretofore described, and each end may be connected to a terminal construction substantially as shown in Fig. 33. Such terminal construction may be a single one, having four bayonet connections, or it may comprise two separate connectors, each having two bayonets. The heater may be bent into a unit substantially as shown in Fig. 14, but having four connections. This provides two entirely independent resistances, 201 and 202, each of which may be energized across the full voltage or the half voltage in parallel or series by any suitable switch construction desired, or as described in my Patent Number 2,259,258.

In the modification shown in Figs. 29 and 30, the sheath 210 contains two resistances 211 and 212. The resistance 211 has its two ends connected to cylindrical connectors 213 and 214, and its intermediate portion 215 bent reversely, so that the current may flow from connector 213 to connector 214 through the resistance 211. Similarly the resistance 212 has its ends connected to cylindrical connectors 216 and 217, and its intermediate portion 218 reversely bent, so that current can flow from connector 216 to 217. One end of the sheath 210 is provided with a ductile plug 219, and the other end is provided with the insulating plug 220, similar in construction to plug 191. This heater may be bent into a unit substantially as shown in Fig. 24 but being more rectangular in cross-section, as indicated in Fig. 30. One of the flat sides is placed at the top of the unit. The conductors 213, 214, 216 and 217 may be connected to a plug substantially as shown in Fig. 33. This heater provides two independent resistances, which may be energized at full voltage or half voltage in parallel or in series, by suitable switch construction, to give a large number of combinations, or as described in my Patent Number 2,259,258.

Figures 19, 20, 21, 22, 23:
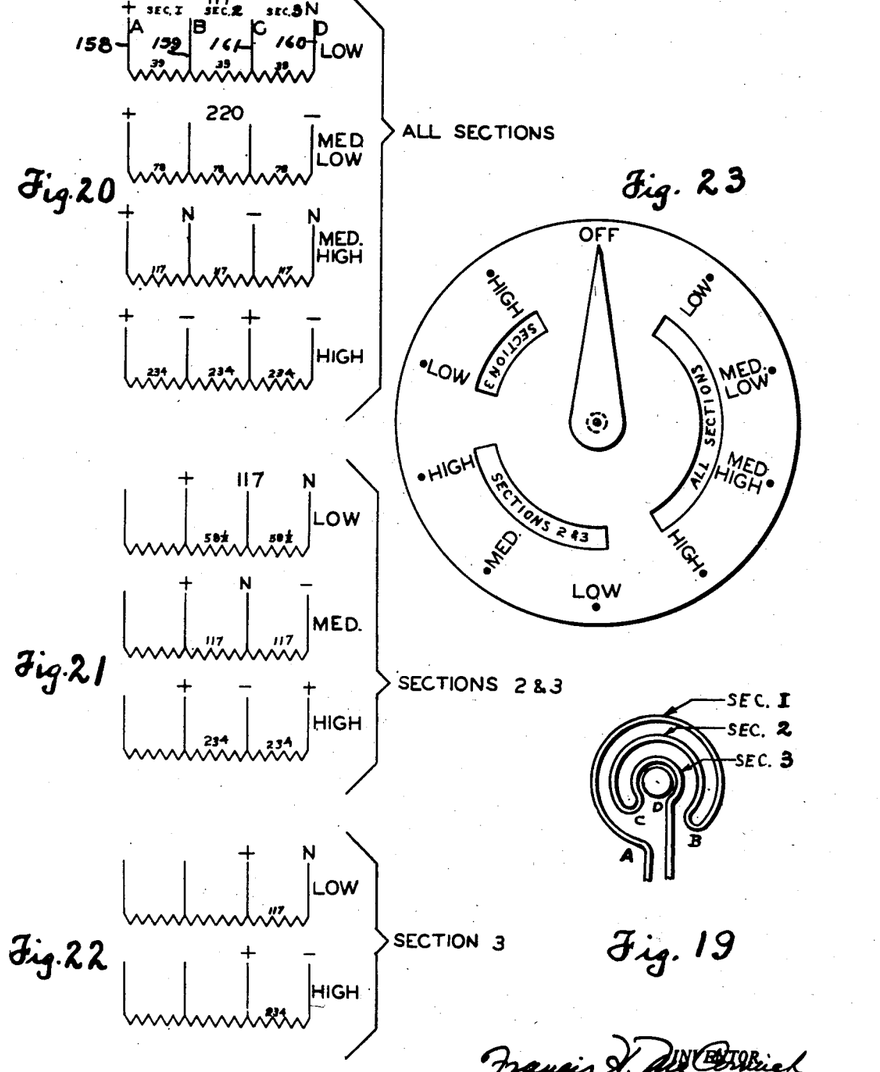
Fig. 19 is a diagrammatic representation of the curving of the heater shown in Fig. 17.
Fig. 20 shows the connections possible in the heater shown in Fig. 17 when all sections are energized.
Fig. 21 shows the connections possible when only two sections are energized.
Fig. 22 shows the connections when only one heater is energized.
Fig. 23 shows the control knob and dial for the switch indicated in Fig. 17.

In the heater shown in Figs. 31 and 32 the sheath 230 contains spiral heaters 231 and 232. The heater 231 is connected to cylindrical conductors 233 and 234 respectively. The heater 232 is connected to cylindrical connectors 235 and 236. The intermediate portion 237 of heater 231 is a reverse bend, as indicated in Fig. 31. The intermediate portion 238 of heater 232 is also a reverse bend adjacent the bend 237, but completely insulated therefrom. The sheath 230 is provided with a ductile plug 239, and an insulating plug 240 substantially of the same construction as heretofore described with respect to Figs. 29 and 30. The heater shown in Figs. 31 and 32 may be bent into a unit substantially as shown in Fig. 23, but having cross-section as indicated in Fig. 32. One of the straight edges 241 of Fig. 32, however, may be the top surface of the unit shown in Fig. 24. The conductors 233 through 236 may be connected to a connector construction substantially as shown in Fig. 33. The heaters of this unit may be connected to a switch as described with respect to Figs. 29 and 30.

The connector shown in Fig. 33 may comprise an insulated casing 250, through the end of which the three or four wire cable 251 passes. An insulated disk 252 is provided with bayonet conductors 253 which are adapted to engage the end of the cylindrical conductors 203 and 206, 213, 214, 216, 217, and 233 through 236, as is evident. The casing 250 may be made in two longitudinal halves, which may be secured at the ears 254 by nuts and bolts, not shown, for final assembly, as is obvious. Each longitudinal half, has a semi-cylindrical opening 255, for the reception of the conductors of the heater, and a semi-cylindrical opening 256 for the reception of cable 251.

While the form of embodiment of the invention as herein disclosed constitutes a preferred form, it is to be understood that other forms might be adopted, as may come within the scope of the claims which follow.

What is claimed is as follows:

1. In combination, a tubular sheath having two ends, a first cylindrical terminal at one end, a second cylindrical terminal at the other end, a spiral resistance in said sheath connected to said terminals, and a conducting rod passing through said first cylindrical terminal and connected to an intermediate point on said resistance.

2. In combination, a tubular sheath having two ends, a first cylindrical terminal at one end, a second cylindrical terminal at the other end, a spiral resistance in said sheath connected to said terminals, a conducting rod passing through said first cylindrical terminal and connected to an intermediate point on said resistance, and another conducting rod passing through said second cylindrical terminal and connected to said resistance intermediate said point and said second cylindrical terminal.

3. In combination, a tubular sheath having two ends, a first cylindrical terminal at one end, a second cylindrical terminal at the other end, a spiral resistance in said sheath connected to said terminals, and a conducting rod passing through said first cylindrical terminal and connected to an intermediate point on said resistance by means of a cylindrical connector of an external diameter substantially the same as the internal diameter of said spiral resistance.

4. In combination, a tubular sheath having two ends, a first cylindrical terminal at one end, a second cylindrical terminal at the other end, a spiral resistance in said sheath connected to said terminals, a conducting rod passing through said first cylindrical terminal and connected to an intermediate point on said resistance, and another conducting rod passing through said second cylindrical terminal and connected to said resistance intermediate said point and said second cylindrical terminal by means of a cylindrical connector of an external diameter substantially the same as the internal diameter of said spiral resistance.

5. In combination, a tubular sheath having two ends, a first terminal at one end, a second terminal at the other end, a spiral resistance in said sheath connected to said terminals, and a conducting rod passing said first terminal and connected to an intermediate point on said resistance.

6. In combination, a tubular sheath having two ends, a first terminal at one end, a second terminal at the other end, a spiral resistance in said sheath connected to said terminals, a conducting rod passing said first terminal and connected to an intermediate point on said resistance, and another conducting rod passing said second terminal and connected to said resistance intermediate said point and said second terminal.

7. In combination, a tubular sheath having two ends, a first terminal at one end, a second terminal at the other end, a spiral resistance in said sheath connected to said terminals, a conducting rod passing said first terminal and connected to an intermediate point on said resistance, and a switch connecting said terminals and conducting rod variously to power lines.

8. In combination, a tubular sheath having two ends, a first terminal at one end, a second terminal at the other end, a spiral resistance in said sheath connected to said terminals, a conducting rod passing said first terminal and connected to an intermediate point on said resistance, another conducting rod passing said second terminal and connected to said resistance intermediate said point and said second terminal, and a switch connecting said terminals and conducting rods variously to power lines.

9. In combination, a tubular sheath having a terminal construction at one end and being sealed at the other end, and a resistance in said sheath connected to said terminal construction, said sheath being bent into a curve forming a substantially flat cooking surface with said terminal construction depending from a central portion.

10. In combination, a tubular sheath having a terminal construction at one end and being sealed at the other end, and a resistance in said sheath connected to said terminal construction, said sheath being bent into a curve forming a substantially flat cooking surface with said terminal construction depending from a central portion, said terminal construction including a pair of co-axial and longitudinally spaced connectors.

11. The method of manufacturing a tubular sheath heater which comprises surrounding a rod conductor with a spiral resistance and connecting said resistance near one end of said rod conductor, partially severing said rod conductor intermediate the connection and said end placing said rod conductor and resistance in a tubular sheath, securing said one end of said rod conductor to a plug secured at one end of said sheath, surrounding the other end of said rod conductor with a tubular connector connected to said resistance, securing said tubular connector and said other end of said rod conductor to another plug resting against the other end of said sheath, filling said sheath with granular insulation, contracting said sheath radially and thus compacting said insulation while elongating said sheath and completing the severance of said conductor where partially severed, and cutting said sheath away at the outer end of said tubular connector to produce connecting means for said rod conductor and connector.

12. In combination, a tubular sheath sealed at one end, a rod conductor and spiral resistance in said sheath connected together near said one end and electrically connectible at the other end of said sheath, an intermittent make and break switch connected to said rod and conductor, and manual adjusting means to initiate the intermittent making and breaking of said switch and to adjust the cycling interval thereof.

13. In combination, a tubular sheath closed at one end, two spiral resistances extending into said sheath each with two ends electrically connectible at the other end of said sheath, granular insulation surrounding said resistances, said sheath being bent into a curve forming a substantially flat cooking surface.

14. In combination, a tubular sheath closed at one end, two spiral resistances extending into said sheath each with two ends electrically connectible at the other end of said sheath, granular insulation surrounding said resistances, said sheath being bent into a curve forming a substantially flat cooking surface, and a bayonet joint connector at said other end of said sheath.

15. In combination, a tubular sheath closed at one end, two spiral resistances extending into said heater each with two ends electrically connectible at the other end of said sheath, granular insulation surrounding said resistances, said sheath being bent into a curve forming a substantially flat cooking surface, and a switch connected to said resistances to impose selectively the full voltage of a three wire power source on one of said resistances and the half voltage on the other resistance.

16. The method of constructing a tubular sheath heater which comprises closing one end of said sheath, inserting two spiral resistances with return bends near said one end, inserting granular insulation into said sheath to space said resistances throughout the length of said sheath, compacting said insulation, and bending said sheath into a curve forming a substantially flat cooking surface.

17. In combination, a tubular sheath having two ends, a first cylindrical terminal at one end, a second cylindrical terminal at the other end, a spiral resistance in said sheath connected to said terminals, a conducting rod passing through said first cylindrical terminal and connected to an intermediate point on said resistance, said sheath being bent into a curve forming a substantially flat cooking surface, with said ends of said sheath extending downwardly, and electrical connecting means for said terminals and conducting rod attached to said ends.

18. An electrical heater comprising, a tubular sheath having a closed end and an open end, a tubular terminal connector at said open end, a helical resistor in said sheath having one end connected to said tubular terminal connector and its other end adjacent said closed end, a conductor spaced from and passing through said tubular terminal connector and connected to said resistor adjacent said closed end, and compacted granular insulating material filling said sheath.

19. The method of manufacturing a tubular sheath heater which comprises surrounding a conductor with a helical resistor and connecting said resistor and conductor adjacent one end of said conductor, weakening said conductor at a point adjacent said one end, inserting said conductor and resistance in a tubular sheath having one closed end and securing said one end of said conductor to the closed end of said sheath, passing the other end of said conductor through a tubular terminal connector and connecting said helical resistor to said tubular terminal connector, placing said tubular terminal connector at the open end of said sheath, filling said sheath with granular insulating material, compacting said insulating material and severing said first named conductor at said weakened point, as a result of the elongation of the sheath which occurs as a result of the compacting process.

FRANCIS H. McCORMICK.

REFERENCES CITED

The following references are of record in the file of this patent:

UNITED STATES PATENTS

| Number | Name | Date |
| --- | --- | --- |
| 1,020,439 | Norwood | Mar. 19, 1912 |
| 1,124,849 | Brush | Jan. 12, 1915 |
| 1,378,324 | Clark et al. | May 17, 1921 |
| 1,394,518 | Abbott | Oct. 25, 1921 |
| 1,474,723 | Levinson | Nov. 20, 1923 |
| 1,667,857 | Harpster et al. | May 1, 1928 |
| 1,684,184 | King | Sept. 11, 1928 |
| 2,094,480 | Vogel | Sept. 28, 1937 |
| 2,390,577 | Ferris | Dec. 11, 1945 |